United States Patent [19]
Lauf et al.

[11] Patent Number: 5,313,325
[45] Date of Patent: * May 17, 1994

[54] BLACKBODY MATERIAL

[75] Inventors: Robert J. Lauf, Oak Ridge; Clyde Hamby, Jr., Harriman; M. Alfred Akerman, Knoxville; Alvin W. Trivelpiece, Oak Ridge, all of Tenn.

[73] Assignee: Martin Marietta Energy Systems, Inc., Oak Ridge, Tenn.

[*] Notice: The portion of the term of this patent subsequent to Sep. 7, 2010 has been disclaimed.

[21] Appl. No.: 74,910

[22] Filed: Jun. 10, 1993

Related U.S. Application Data

[63] Continuation-in-part of Ser. No. 916,808, Jul. 20, 1992, Pat. No. 5,243,464.

[51] Int. Cl.$^5$ ............................................. G02B 27/00
[52] U.S. Cl. .................................... 359/614; 359/885; 359/888; 359/350; 359/361
[58] Field of Search ............... 359/614, 885, 888, 350, 359/361; 385/1

[56] References Cited

U.S. PATENT DOCUMENTS 5,243,464  9/1993  Lauf et al. ........................... 359/614

OTHER PUBLICATIONS

G. C. Wei, et al., "Development and Characterization of Carbon-Bonded Carbon Fiber Insulation for Radioisotope Space Power Systems" ORNL/TM-9381 Published by Oak Ridge National Laboratory, Oak Ridge, Tenn. - Jun. 1985.

*Primary Examiner*—Loha Ben
*Attorney, Agent, or Firm*—Joseph A. Marasco; Harold W. Adams

[57] ABSTRACT

A light emitting article comprises a composite of carbon-bonded carbon fibers, prepared by: blending carbon fibers with a carbonizable organic powder to form a mixture; dispersing the mixture into an aqueous slurry; vacuum molding the aqueous slurry to form a green article; drying and curing the green article to form a cured article; and, carbonizing the cured article at a temperature of at least about 1000° C. to form a carbon-bonded carbon fiber light emitting composite article having a bulk density less than 1 g/cm$^3$.

35 Claims, 3 Drawing Sheets $\lambda = 10.6 \mu m$
$\varphi_\iota = 30°$

BLACKBODY MATERIAL

The United States Government has rights in this invention pursuant to contract no. DE-AC05-84OR21400 between the United States Department of Energy and Martin Marietta Energy Systems, Inc. The invention arose in the course of research funded by the U.S. Army Strategic Defense Command under Interagency Agreement Number 1896-1562-A1.

CROSS-REFERENCE TO RELATED APPLICATION

This application is a continuation-in-part application under 37 CFR §1.53 of U.S. patent application Ser. No. 07/916,808, filed on Jul. 20, 1992, the entire disclosure of which is incorporated herein by reference, now U.S. Pat. No. 5,243,464.

FIELD OF THE INVENTION

The present invention relates to light emitting materials and more particularly to materials having a three-dimensional porous structure that retains its light emitting properties after surface contact, abrasion, or machining.

BACKGROUND OF THE INVENTION

In the field of temperature measurement using optical pyrometers, infrared spectrometers, or the like, there is a need for standards and calibration devices which possess emissive properties that approach those of an ideal blackbody, also called a blackbody radiator. For the ideal blackbody, the total radiant emissivity varies directly with the fourth power of the absolute temperature, i.e., $$M^b(T) = \sigma T^4$$

where $\sigma$ is constant. Materials can be characterized by a total emissivity $\epsilon(T)$ relating the total radiant emissivity $M(T)$ (total power emitted per unit area) to that of a blackbody $M^b(T)$ at the same temperature by $$M(T) = \epsilon(T) M^b(T).$$

Typical values of $\epsilon(T)$ at $T = 300K$ for a few solid materials are given in Table 1. Kirchhoff's Law states that an object having the maximum possible absorbance also has the maximum possible emissivity.

TABLE 1

| Material | Temperature, °C. | Emissivity, $\epsilon$ |
| --- | --- | --- |
| Brick, common red | 20 | 0.93 |
| Candle soot (carbon) | 20 | 0.95 |
| Graphite, filed surface | 20 | 0.98 |
| Concrete | 20 | 0.92 |
| Glass, polished plate | 20 | 0.94 |
| Magnesium, polished | 20 | 0.07 |

An ideal blackbody can be closely approximated by an aperture in an isothermal cavity. A layer of soot on a smooth surface has reasonably high emissivity ($\epsilon = 0.95$), but is generally considered to be inconvenient to fabricate, and is easily damaged by surface contact.

OBJECTS OF THE INVENTION

Accordingly, it is an object of the present invention to provide a new and improved light emitter that is lightweight, yet robust and not rendered ineffective by surface contact.

It is another object of the present invention to provide a light emitter which does not rely on a special surface layer for high emissivity, and therefore can be manufactured in bulk and machined directly to final dimensions.

It is a further object of the present invention to provide a light emitter with light emitting properties which are generally not rendered ineffective or inconsistent by small changes in manufacturing process variables.

It is another object of the present invention to provide a light emitter that is environmentally stable and resistant to thermal and radiation damage.

Further and other objects of the present invention will become apparent from the description contained herein.

SUMMARY OF THE INVENTION

In accordance with one aspect of the present invention, the foregoing and other objects are achieved by a light emitting article which comprises a composite of carbon-bonded carbon fibers, the composite having a bulk density of not more than about 1 g/cm$^3$, the composite having the form of a light emitting article.

In accordance with another aspect of the present invention, an optical device comprises, in combination:

a light sensing component for receiving light energy and producing useful information therefrom; and, a light emitting component for minimizing the reception of undesired light by the light sensing component, the light emitting component comprising a composite of carbon-bonded carbon fibers, the composite having a bulk density of not more than about 1 g/cm$^3$.

In accordance with a further aspect of the present invention, a process for preparing a light emitting article comprises the steps of:

a. blending carbon fibers with a carbonizable organic powder to form a mixture;

b. dispersing the mixture into an aqueous slurry;

c. vacuum molding the aqueous slurry to form a green article;

d. drying and curing the green article to form a cured article; and, e. carbonizing the cured article at a temperature of at least about 1000° C. to form a carbon-bonded carbon fiber light emitting composite article having a bulk density less than 1 g/cm$^3$.

BRIEF DESCRIPTION OF THE DRAWING

In the drawings:

FIG. 2 also shows that the light absorbing properties are essentially equal for surfaces parallel and perpendicular to the molding direction.

Figure 1:
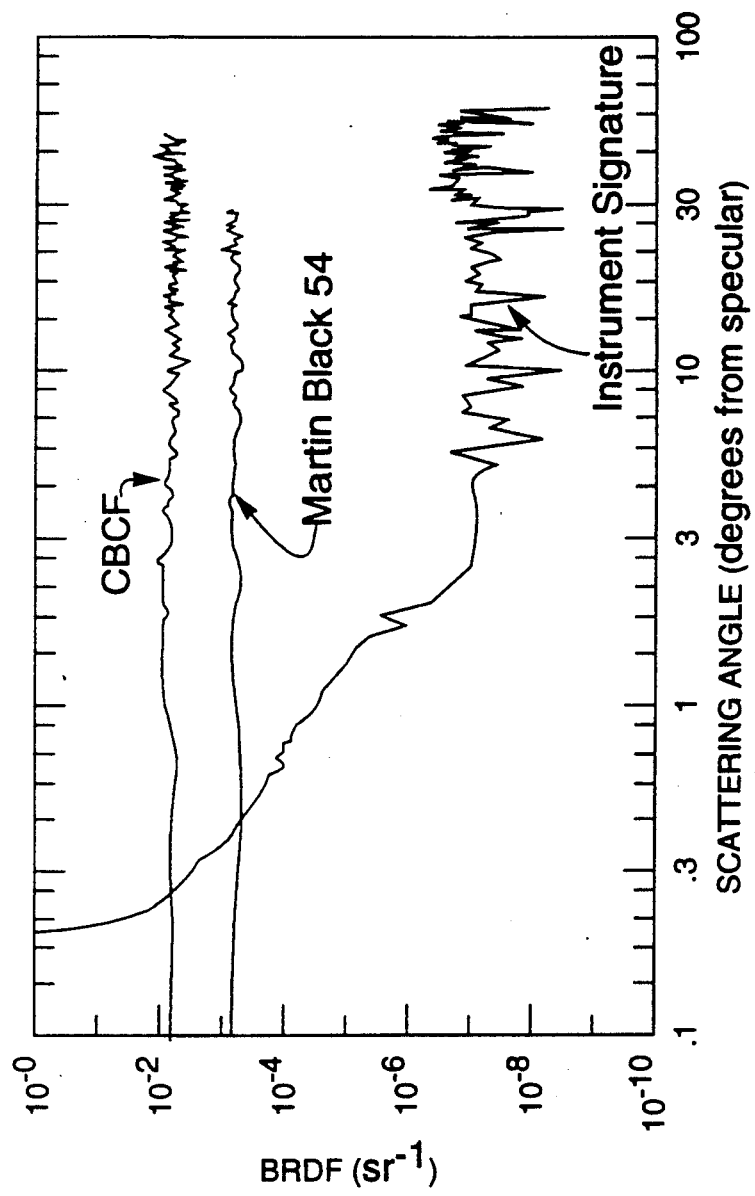
FIG. 1 is a graphic comparison of bidirectional reflected distribution function (BRDF) as a function of scattering angle for light emitting material prepared according to the present invention and for anodized aluminum.

For a better understanding of the present invention, together with other and further objects, advantages and capabilities thereof, reference is made to the following disclosure and appended claims in connection with the above-described drawings.

DETAILED DESCRIPTION OF THE INVENTION

Generally, the light emitting material is prepared by mixing chopped carbon fibers and a carbonizable matrix precursor such as phenolic resin or the like in an aqueous slurry. The slurry is vacuum molded and dried, then heated slowly to cure the resin, crosslinking the resin and bonding the fibers together into a low-density composite body. The composite is then heated in a nonreactive atmosphere such as nitrogen, noble gas or vacuum, to a temperature of at least about 1200° C., preferably about 1600° C., to carbonize the resin phase. The finished carbon bonded carbon fiber (CBCF) product is believed to achieve its high optical emission by virtue of numerous microscopic spaces between its constituent fibers and because both the fibers and binder phase are black.

The production of low density chopped-fiber CBCF composites has previously been devoted to the manufacture of high-temperature thermal insulation for specialized furnaces and particularly for radioisotope thermal generators. For more information, see the following report published by Oak Ridge National Laboratory, Oak Ridge, Tenn: G. C. Wei and J. M. Robbins, Development and Characterization of Carbon-Bonded Carbon-Fiber Insulation for Radioisotope Space Power systems, Report No. ORNL/TM-9381, 1985, the entirety of which is incorporated herein by reference. Heretofore unnoticed, unexpected, and unappreciated are the unusual optical properties of these materials which make them suitable for many light emitter articles and components.

The carbon fibers used in the preparation of the light emitter are preferably of small diameter, generally not more than about 20 $\mu$m, and of short length, generally not more than about 1 mm, more preferably not more than about 0.5 mm. Larger sized fibers can be pretreated to reduce the size in order to produce optimally effective CBCF light emitting components. Rayon fibers, $(C_6O_5H_{10})_n$, chopped to lengths of less than about 1 mm, are especially suitable. Carbon fibers derived from polyacrylonitrile (PAN), $(CH_2CHCN)_n$, are also suitable. Light emitting articles prepared with PAN will have additional beneficial properties such as increased resistance to thermal damage. Suitable carbon fibers can also be derived from coal or petroleum pitch.

EXAMPLE I

Small-diameter continuous rayon filaments were precision chopped to 0.25 mm lengths with a flock cutter. The rayon filaments were examined and found to have a nominal diameter of 10.5 $\mu$m and a serrated cross section characteristic of regenerated viscose rayon made from wood pulp. The chopped rayon fibers were carbonized at 1350° C. for 3 h in an inert atmosphere. The carbon yield was about 25 wt %. During carbonization, the fibers shrank to an average diameter of about 6.5 $\mu$m and an average length of about 0.15 mm. The carbon fibers were then deagglomerated by wet ball milling. The carbon fibers were subsequently blended in a water slurry tank and dried. The carbon fibers were then ready for use in preparing light emitting material.

The preferred matrix precursor is a carbonizable organic material such as phenolic resin. The matrix precursor is preferably pretreated by sieving prior to use in order to produce optimally effective CBCF light emitting components. A suitable matrix precursor is a powderous phenolic resin available under the trade name "Durez 22352" from Occidental Chemical Corp., Durez Div. North Tonawanda, N.Y., USA. This particular phenolic resin is a B-stage, two-step, thermosetting resin comprising novolac, $(C_6O_5OHCH_2)_n$, containing about 8 wt % of hexamethylenetetramine, $(CH_2)_6N_4$, an activator for polymerization.

EXAMPLE II

A sample of Durez 22352 phenolic resin was analyzed; the average particle size was 9 $\mu$m, and the carbon yield after pyrolysis was 50 wt %. The phenolic resin was sieved through a 200-mesh screen to remove agglomerates prior to use in preparing the light emitting material.

About 380 g of carbon fibers prepared according to Example I were mechanically slurried in 130 l water for 30 min. About 250 g of the phenolic resin was added to the water-fiber slurry to form a dilute fiber-resin-water slurry containing less than about 0.5 wt % solids. The solids contained about 54 wt % carbon fibers and about 46 wt % phenolic resin. The dilute fiber-resin-water slurry was blended for 20 min to obtain a homogeneous distribution, and was then vacuum molded into tubular and plate shaped green articles, with the resin particles being uniformly dispersed throughout the fibers. A forced-draft air dryer was used to dry the molded green articles at 50° C. for 16 h. The curing process was then accomplished by stepwise heating: 3 h at 80° C., 3 h at 100° C., and 12 h at 130° C. in the forced-draft air dryer. The cured articles were carbonized to form the final light emitting articles by heating, in an argon atmosphere, at a rate of about 300° C./h to about 1600° C. and holding at that temperature for about 3 h. The densities of the carbonized articles ranged from about 0.2 to about 0.25 g/cm$^3$.

EXAMPLE III

Light emitting articles prepared according to Example II were tested for light absorption. Optical scatter was measured at a wavelength of 10.6 $\mu$m for scattering angles from 0.1 to 100 degrees from specular. The result of such a measurement, compared with the same measurement taken for Martin Black 54, is shown in FIG. 1. It was unexpectedly observed that light scattering by the articles appeared to be totally Lambertian; no specular scattering was observed.

EXAMPLE IV

Figure 3:
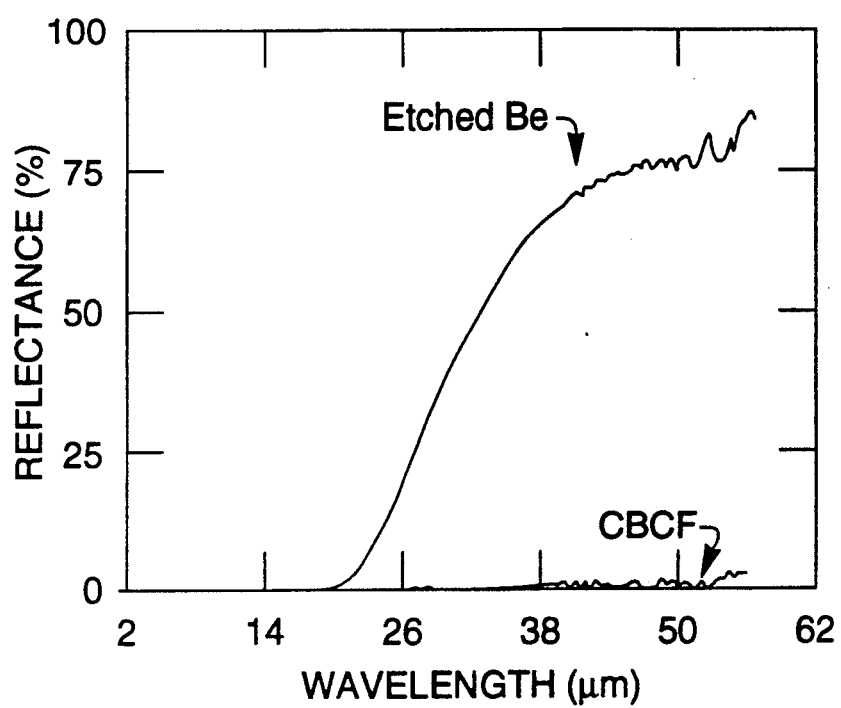
FIG. 3 is a graphic comparison of reflectance as a function of wavelength for light emitting material prepared according to the present invention and for etched beryllium.

A light emitting article prepared according to Example II was compared with an etched beryllium light absorber. Spectral reflectance was measured for infrared wavelengths from 2 to 55 $\mu$m. The data, shown in FIG. 3, demonstrate that the article is uniformly light absorbing up to at least 50 $\mu$m, in marked contrast to the etched beryllium light absorber, which effectively absorbs wavelengths only up to about 20 $\mu$m.

When Kirchhoff's Law is applied to the results obtained in Example IV, it is concluded that the light emitting article prepared according to Example II is a good emitter up to at least 50 $\mu$m.

EXAMPLE V

A light emitting article prepared according to Example II was tested for emissivity using an emissometer, model AE, obtained from Devices and Services Company. The testing was performed in a manner described by T. G. Kollie, et al. in "Evaluation of a commercial, portable, ambient-temperature emissometer", *Rev. Sci. Inst.* 61(5), 1509-17, 1990. For comparison, a dense graphite article, obtained from Stackpole Carbon Company, St. Marys, Pa., was also tested. Two tests were run for each article, one on a smooth surface and a second test on a surface that had been subjected to machining with a small file. The results, shown in the following Table 2, indicate that the emissivity of the light emitting article prepared according to the invention is quite insensitive to surface machining in comparison to the dense graphite. Even though the dense graphite showed increased emissivity upon filing, it is sensitive to surface changes, whereas the CBCF emissivity remained stable, indicating better suitability for use as an emissivity calibration standard.

TABLE 2

| Material | Emissivity |
| --- | --- |
| Graphite, Smooth Surface | 0.65 |
| Graphite, Filed Surface | 0.82 |
| CBCF, Smooth Surface | 0.62 |
| CBCF, Filed Surface | 0.63 |

Light emitting articles can be prepared by molding an oversized billet of the material and machining or deforming it to net size and shape. Machining includes cutting, grinding, sawing, sanding, embossing, etc. Therefore, highly complex shaped light emitting articles can be manufactured. Removal of surface material by machining-even smoothing with sandpaper-does not deleteriously affect the light emitting or scattering ability of articles prepared in accordance with the invention.

EXAMPLE VI

Figure 2:
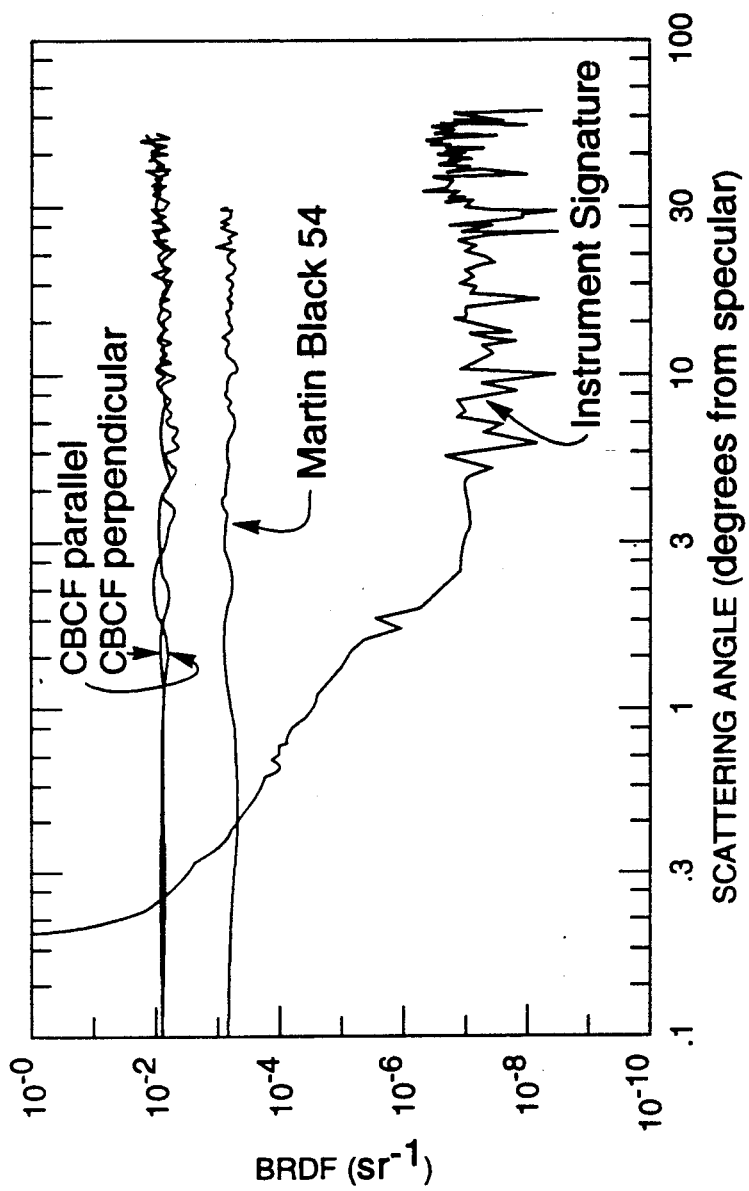
FIG. 2 is a graphic comparison similar to FIG. 1, after abrasion of the light emitting surface, showing that the light absorbing properties are not diminished by surface abrasion.

A light emitting article prepared according to Example II was machined by smoothing the surface with sandpaper. An unexpected result was that such smoothing had no measurable effect on the light absorbing or emitting properties of the article, as shown in FIG. 2. More unexpectedly, even though the articles showed some preferential orientation of the fibers relative to the molding direction, it was observed that the light absorbing or emitting properties were substantially isotropic, also shown in FIG. 2.

Light emitting articles can be prepared with widely varying weight percentages of carbon fibers to matrix precursor. About 80 wt % carbon fibers to about 20 wt % resin will produce a lower density article that has higher light emitting properties, but lower strength and vibration resistance. About 20 wt % carbon fibers to about 80 wt % resin will produce a higher density article that has higher strength and vibration resistance, but somewhat lower light emitting properties. Intermediate ratios will produce articles with intermediate properties in trade-off fashion. Therefore, a more preferred ratio for many applications is likely in the range of about 70 wt % carbon fibers and about 30 wt % resin to about 30 wt % carbon fibers and about 70 wt % resin.

EXAMPLE VII

A denser light emitting article was prepared in a manner similar to Example II, but with about 30 wt % carbon fiber and about 70 wt % resin. The density of the carbonized article was increased to approximately 0.3 g/cm$^3$. Total scatter was approximately $10^{-2}$s$^{-1}$, slightly higher than that of the emitters prepared in Example II, still within an acceptable range for many light emitter applications.

EXAMPLE VIII

A light emitting article was prepared in a manner similar to Example II, but with 60 wt % resin and 40 wt % fibers. The optical properties thereof were intermediate, as shown in the following Table 3.

TABLE 3

| Sample | Fibers, wt % | Resin, wt % | Bulk Density, g/cm$^3$ | BRDF, s$^{-1}$ |
| --- | --- | --- | --- | --- |
| 1 | 54 | 46 | 0.20–0.25 | 6 × 10$^{-3}$ |
| 2 | 30 | 70 | 0.30 | 9 × 10$^{-3}$ |
| 3 | 40 | 60 | 0.29 | 7 × 10$^{-3}$ |

Note: BRDF measured at 0° from specular.

The foregoing examples show one of ordinary skill in the art how to vary the ratio of carbon fibers to matrix in order to modify the strength, density, and optical properties of a light emitting article to satisfy some particular requirements.

Light emitting articles which must withstand high degrees of physical stresses may be supported by attachment to a backing comprising a more robust substrate, usually in a laminated fashion. Many and various substrates, attachment configurations and attachment methods can serve this purpose.

A carbonizable organic adhesive is used to bond the light emitting material to a structural graphite substrate. A carbonizable organic adhesive can be prepared by blending some of the same material used as the matrix precursor with an organic solvent such as acetone or ethanol to obtain a viscous solution, slurry or paste. At least part of the "back" surface (a "back" surface is any surface not intended to function as a light emitting surface) of the light emitting material is coated with adhesive and brought into contact with the structural graphite substrate to form an assembly. Alternatively, the graphite or both mating surfaces may receive a coating of adhesive. The assembly is dried to allow evaporation of the solvent. The dried assembly is preferably cured by stepwise heating, with many variations possible, depending on the size and configuration of the assembly. The particulars of the curing steps are not critical; for a small assembly, one might utilize steps such as: about 2 to 4 h at a temperature of about 60° to 80° C., followed by about 2 to 4 h at a temperature of about 90° to 110° C, followed by 10 to 12 h at a temperature of about 120° to 140° C. The adhesive is carbonized by heating the assembly in a nonreactive atmosphere to a temperature of at least 1200° C., preferably about 1600° C., to bond the article to the substrate. The resulting assembly is stronger and more rigid, yet possesses the beneficial light emitting properties of the invention. Any and all surfaces of the carbonized assembly can be machined to final dimensions.

EXAMPLE IX

A carbonizable organic adhesive was prepared by blending 30 ml of powdered phenolic resin and 20 ml of ethanol. A disk of light emitting material was prepared according to Example VII. A coating of the adhesive was applied to one face of a disk of structural graphite, obtained from Stackpole Carbon Co., St. Marys, Pa. The disk of light emitting material was then pressed lightly against the coated graphite surface and the entire assembly was dried overnight in air. The dried assembly was cured by heating 3 h at 80° C., 3 h at 100° C., and 12 h at 130° C. The adhesive was carbonized by heating 3 h at 1600° C. in nitrogen. After carbonization the entire assembly was much stronger and more rigid than the original disk of light emitting material.

EXAMPLE X

A carbonizable organic adhesive was made by blending 30 ml of powdered phenolic resin and 20 ml of acetone. This adhesive was used as in Example IX to prepare an assembly. After carbonization the assembly was strong and rigid.

The light emitting material can be brazed to a metal or ceramic substrate. Many well known brazing methods are quite suitable for this purpose. For instance, the light emitting material can be brazed to a copper substrate using a typical Au-Cu brazing alloy at about 1035° C. in a hydrogen atmosphere. The light emitting material can be secured to any support substrate by any suitable securing means, including conventional adhesives, fasteners, and the like.

A light emitting article prepared in accordance with the invention can be mounted with a light sensing component in an optical device, either internally or externally. Examples of optical devices include infrared, ultraviolet, and visual light detectors, film and electronic cameras, photocells, and any other device that senses light energy. The human eye is also considered an optical sensor, used in conjunction with optical devices. Many optical devices such as telescopes, microscopes, and targeting devices include light processing components such as reflectors, refractors, beam splitters, and waveguides. A support structure is generally used to support the optical device and light processing components. The support structure can include means for adjusting the position of the optical device, including tracking mechanisms and associated electronics. Furthermore, if the light sensing component is of the electronic type, the optical device usually includes a signal processing device for converting a signal generated by the light sensing component into an image or other useful information. Light emitting articles prepared in accordance with the invention and properly mounted on such optical devices will provide a well-characterized spectral emissivity, thereby allowing the optical devices to be properly calibrated and/or adjusted.

While there has been shown and described what are at present considered the preferred embodiments of the invention, it will be obvious to those skilled in the art that various changes and modifications can be made therein without departing from the scope of the inventions defined by the appended claims.

What is claimed is:

1. A light emitting article comprising a composite of carbon-bonded carbon fibers, said composite having a bulk density of not more than about 1 g/cm$^3$, said composite having the form of a light emitting article.

2. A light emitting article in accordance with claim 1 wherein said carbon fibers have individual diameters generally not more than about 25 $\mu$m.

3. A light emitting article in accordance with claim 1 wherein said carbon fibers have individual lengths generally not more than about 1 mm.

4. A light emitting article in accordance with claim 1 further comprising macroscopic surface features for enhancing light emission.

5. A light emitting article in accordance with claim 1 further comprising a support means for supporting said light emitting article.

6. A light emitting article in accordance with claim 5 wherein said support means comprises a graphite substrate secured to said light emitting article.

7. A light emitting article in accordance with claim 6 wherein said graphite substrate is secured to said light emitting article by a carbonized adhesive.

8. A light emitting article in accordance with claim 5 wherein said support means comprises a metal or ceramic substrate secured to said light emitting article.

9. A light emitting article in accordance with claim 1 further comprising a temperature maintaining means for maintaining the temperature of said light emitting article at a particular temperature.

10. An optical device comprising, in combination:
   a light sensing component for receiving light energy and producing useful information therefrom; and,
   a light emitting component for calibrating said light sensing component, said light emitting component comprising a composite of carbon-bonded carbon fibers, said composite having a bulk density of not more than about 1 g/cm$^3$.

11. An optical device in accordance with claim 10 wherein said carbon fibers have individual diameters generally not more than about 25 $\mu$m.

12. An optical device in accordance with claim 10 wherein said carbon fibers have individual lengths generally not more than about 1 mm.

13. An optical device in accordance with claim 10 wherein said composite further comprises macroscopic surface features for enhancing light emission.

14. An optical device in accordance with claim 10 further comprising a support means for supporting said light emitting component.

15. An optical device in accordance with claim 14 wherein said support means comprises a graphite substrate secured to said light emitting component.

16. An optical device in accordance with claim 15 wherein said graphite substrate is secured to said light emitting component by a carbonized adhesive.

17. An optical device in accordance with claim 14 wherein said support means comprises a metal or ceramic substrate secured to said light emitting component.

18. An optical device in accordance with claim 10 further comprising a light processing component for processing said light energy prior to reception by said light sensing component.

19. An optical device in accordance with claim 18 wherein said light processing component is selected from the group consisting of a reflector, a refractor, a beam splitter, and a waveguide.

20. An optical device in accordance with claim 10 further comprising a support structure for supporting said optical device.

21. An optical device in accordance with claim 20 wherein said support structure comprises positional adjusting means.

22. An optical device in accordance with claim 10 wherein said useful information comprises an electrical signal, and wherein said optical device further comprises signal processing means for processing said electrical signal.

23. An optical device in accordance with claim 10 further comprising a temperature maintaining means for maintaining the temperature of said light emitting component at a particular temperature.

24. A process for preparing a light emitting article comprising the steps of:
   a. blending carbon fibers with a carbonizable organic powder to form a mixture;
   b. dispersing said mixture into an aqueous slurry;
   c. vacuum molding said aqueous slurry to form a green article;
   d. drying and curing said green article to form a cured article; and,
   e. carbonizing said cured article at a temperature of at least about 1000° C. to form a carbon-bonded carbon fiber light emitting composite article having a bulk density less than 1 g/cm$^3$.

25. A process for preparing a light emitting article in accordance with claim 24 wherein said carbon fibers are derived from a fibrous material selected from the group consisting of rayon, polyacrylonitrile, and pitch.

26. A process for preparing a light emitting article in accordance with claim 24 wherein said carbon fibers have individual diameters generally not more than about 25 μm.

27. A process for preparing a light emitting article in accordance with claim 24 wherein said carbon fibers have individual lengths generally not more than about 1 mm.

28. A process for preparing a light emitting article in accordance with claim 24 wherein said carbonizable organic powder comprises pitch or a thermosetting resin.

29. A process for preparing a light emitting article in accordance with claim 28 wherein said thermosetting resin comprises a phenolic resin.

30. A process for preparing a light emitting article in accordance with claim 29 wherein said phenolic resin comprises a mixture of novolac and hexamethylenetetramine.

31. A process for preparing a light emitting article in accordance with claim 24 wherein said composite has a fiber content of not less than about 20 wt % and not greater than about 80 wt %.

32. A process for preparing a light emitting article in accordance with claim 24 wherein said composite article has a fiber content of not less than about 30 wt % and not greater than about 70 wt %.

33. A process for preparing a light emitting article in accordance with claim 24 further comprising the additional step of machining said light emitting article to final dimensions.

34. A process for preparing a light emitting article in accordance with claim 24 further comprising the additional steps of:
   f. coating a portion of a surface of said light emitting article with a carbonizable adhesive;
   g. bringing said coated portion in contact with a graphite substrate to form an assembly; and,
   h. carbonizing said adhesive to bond said light emitting article to said graphite substrate.

35. A process for preparing a light emitting article in accordance with claim 34 further comprising the additional step of machining said assembly to final dimensions.

* * * * *